United States Patent [19]
Kawaguchi et al.

[11] Patent Number: 5,828,871
[45] Date of Patent: Oct. 27, 1998

[54] INFORMATION PROCESSING APPARATUS WITH CONNECTION BETWEEN MEMORY AND MEMORY CONTROL UNIT

[75] Inventors: Hitoshi Kawaguchi, Yokohama; Koichi Kimura, Kamakura; Hideki Kamimaki; Takayuki Tamura, both of Yokohama; Kazushi Kobayashi, Ebina, all of Japan

[73] Assignee: Hitachi, Ltd., Tokyo, Japan

[21] Appl. No.: 601,546

[22] Filed: Feb. 14, 1996

[30] Foreign Application Priority Data

Feb. 15, 1995 [JP] Japan .................................... 7-026894

[51] Int. Cl.⁶ ..................................................... G06F 1/10
[52] U.S. Cl. ............................................................ 395/559
[58] Field of Search .................................... 395/494, 845, 395/559, 432, 448, 878

[56] References Cited

U.S. PATENT DOCUMENTS 5,463,756  10/1995  Saito et al. ............................... 395/494
5,623,638   4/1997  Andrade .................................... 395/494

FOREIGN PATENT DOCUMENTS

0603699  11/1980  Japan .

Primary Examiner—Thomas M. Heckler
Attorney, Agent, or Firm—Antonelli, Terry, Stout, & Kraus, LLP

[57] ABSTRACT

An information processing apparatus is provided which is capable of carrying out the higher memory access. The information processing apparatus includes a memory unit of a synchronous DRAM device which serves to output data synchronously with the supplied clock signal, and a control unit for controlling the access to the memory unit in accordance with an instruction issued from a CPU. The clock signal which is to be supplied to the memory unit is outputted from the control unit. The clock signal which has been outputted from the control unit is supplied to the memory unit and also is pulled back to the control unit. The control unit fetches therein the data, which has been outputted from the storage unit, at the timing which is determined on the basis of the pulled back clock signal. As a result, the control unit reduces the difference between a delay of the data which is outputted from the control unit and a delay of the clock signal which is used to determine the timing at which the data is fetched therein.

12 Claims, 8 Drawing Sheets

INFORMATION PROCESSING APPARATUS WITH CONNECTION BETWEEN MEMORY AND MEMORY CONTROL UNIT

BACKGROUND OF THE INVENTION

1. Field of the Invention

The present invention relates in general to an information processing apparatus such as a personal computer, a work station or the like, and more particularly to a method of controlling a memory provided in such an apparatus.

2. Description of the Related Art

In recent years, an information processing apparatus such as a personal computer, a work station or the like has kept on being miniaturized as well as being promoted with respect to the high performance. The throughput of a microprocessor which is the main unit of such an information processing apparatus has been rapidly enhanced by being supported by the progress of the semiconductor process technology. Thus, the product has appeared which exhibits the high performance at a high operation frequency while keeping the power consumption low. Along with such rapid enhancement of the capability of the microprocessor, the memory is required which can cope with the enhanced throughput of the microprocessor. Then, as for the new memory device which compensates for a difference between the capability of the microprocessor and that of the memory device, a synchronous dynamic random access memory device (hereinafter, referred to as "a synchronous DRAM device" for short, when applicable) has appeared in the market.

The synchronous DRAM device serves to carry out the operation of reading out the data every one clock period for the request of reading out the data synchronously with the given driving clock signal, and has the feature in which it can cope with the high operation frequency of the microprocessor. At the present time, the synchronous DRAM device which can cope with the driving clock frequency of 100 MHz (one clock signal corresponds to 10 ns) has been manufactured. As for such a memory control method, there is known the technology which is disclosed in JP-B-60-3699 for example.

In the case where the synchronous DRAM device as described above is applied to a memory system of the information processing apparatus, for the performance of an input-output buffer of an LSI for controlling a memory, the temperature and the power source voltage, the dispersion in characteristics of the synchronous DRAM device against the change in the operation environment needs to be taken into consideration. The dispersion in the characteristics of the synchronous DRAM device due to the change in the operation environment is an obstacle to bringing out the high operation performance of the synchronous DRAM device and as a result the driving clock frequency of the current practical memory system is limited to about 33 MHz (one clock signal corresponds to 30 ns). Therefore, it can be said that under the present circumstances, it is impossible to make the best use of the high speed reading performance of the synchronous DRAM device as much as possible.

SUMMARY OF THE INVENTION

It is therefore an object of the present invention to provide an information processing apparatus which is capable of reading out the data from the synchronous DRAM device on the basis of the driving clock signal of the high frequency irrespective of the change in the operation environment.

According to the present invention, an information processing apparatus is constructed by including a memory unit for storing the data and a control unit for controlling the operation of reading/writing the data from/to the memory unit. According to the preferred aspect, the memory unit outputs the data synchronously with an inputted clock signal. A first wiring through which the clock signal is delivered from the control unit to the memory unit, a second wiring through which the data is delivered from the memory unit to the memory control unit, and a third wiring which branches from the first wiring in order to pull back the clock signal to the memory control unit are respectively distributed between the memory unit and the memory control unit. The memory control unit includes a storage unit for storing the data, which has been read out from the memory unit, at the timing which is determined on the basis of the clock signal which has been pulled back through the third wiring.

More preferably, the branch of the third wiring from the first wiring is provided in the vicinity of the memory unit, and the clock signal just before delivered to the storage unit is pulled back to the control unit, and the control unit fetches the data in the storage unit at the timing of that clock signal.

Each of the data which has been outputted from the storage unit synchronously with the clock signal to be delivered to the control unit, and the clock signal which has been pulled back to the control unit through the third wiring contains both a delay due to the wiring and a delay due to an internal circuit of the control unit. While those delays are changed by the change in the environment, those delays are contained in the data delivered to the control unit as well as in the clock signal thus pulled back, whereby the delay of the data and the delay of the clock signal pulled back are changed with the same tendency by the change in the environment. Therefore, it is possible to reduce the variable difference between the delay of the data and the delay of the clock signal. As a result, the data which has been outputted synchronously with the clock signal can be always written to the storage unit at the same timing irrespective of the change in the environment, and hence it is possible to increase the clock frequency. As a result, it is possible to construct the information processing apparatus which is capable of fetching the data from the storage unit at the high speed.

DESCRIPTION OF THE PREFERRED EMBODIMENTS

The preferred embodiments of the present invention will hereinafter be described with reference to the accompanying drawings.

Figure 1:
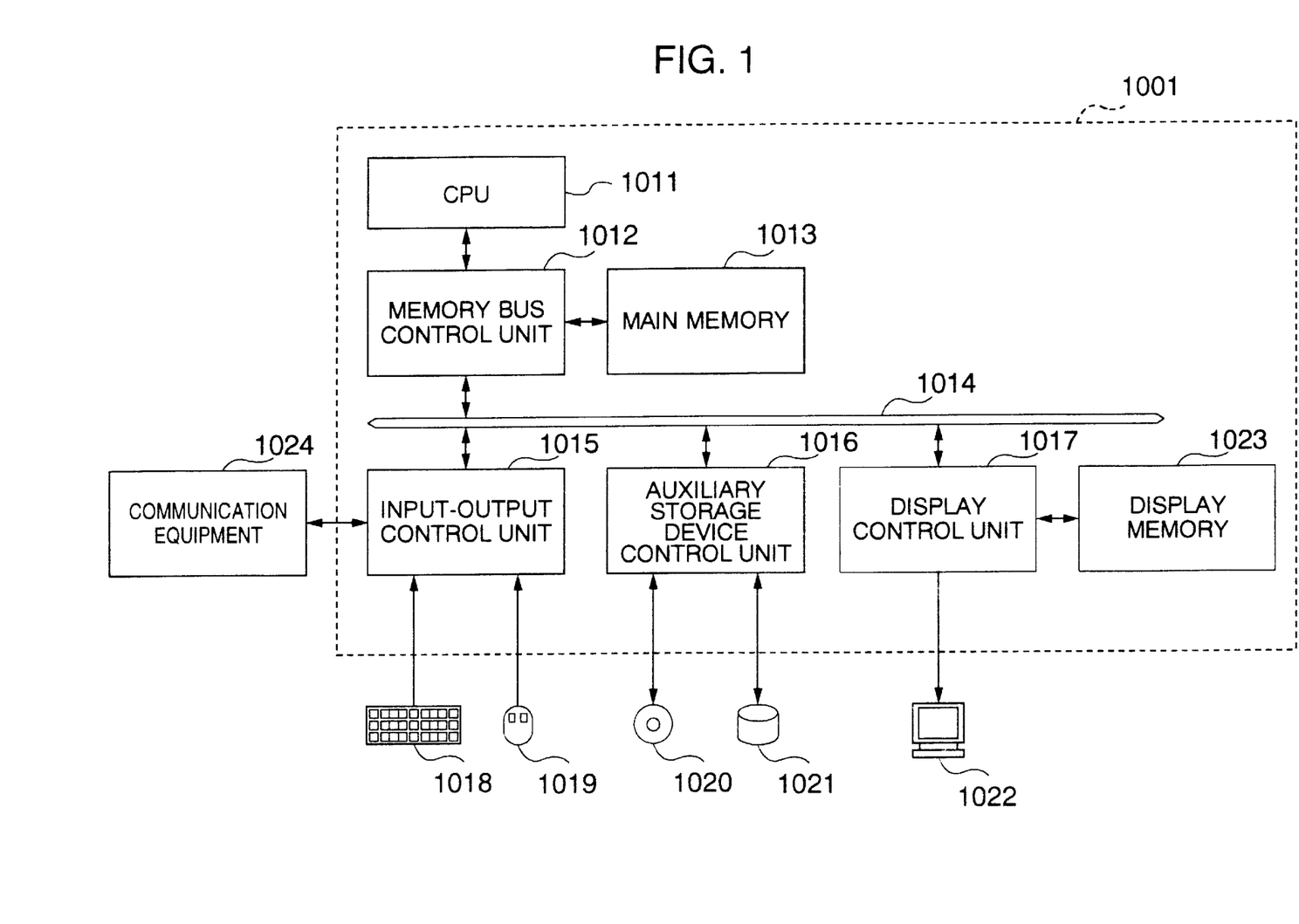
FIG. 1 is a block diagram showing a configuration of an information processing apparatus according to an embodiment of the present invention.

FIG. 1 is a block diagram showing a configuration of an information processing apparatus according to an embodiment of the present invention. As shown in FIG. 1, an information processing apparatus 1001 of the present embodiment includes, but is not limited to, a CPU 1011, a memory bus control unit 1012, and a main memory 1013. The memory bus control unit 1012 is connected to a bus 1014. Both the CPU 1011 and the main memory 1013 are connected to the bus 1014 through the memory bus control unit 1012. In addition thereto, an input-output control unit 1015, an auxiliary storage device control unit 1016, a display control unit 1017, and a display memory 1023 are respectively connected to the bus 1014. A keyboard 1018, a mouse 1014, and communication equipment 1024 which are provided in the outside of the information processing apparatus are respectively connected to the input-output control unit 1015. A compact disc 1020 and a hard disc 1021 are respectively connected as external storage devices to the auxiliary storage device control unit 1016. In addition, a display 1022 is connected to the display control unit 1017.

Figure 2:
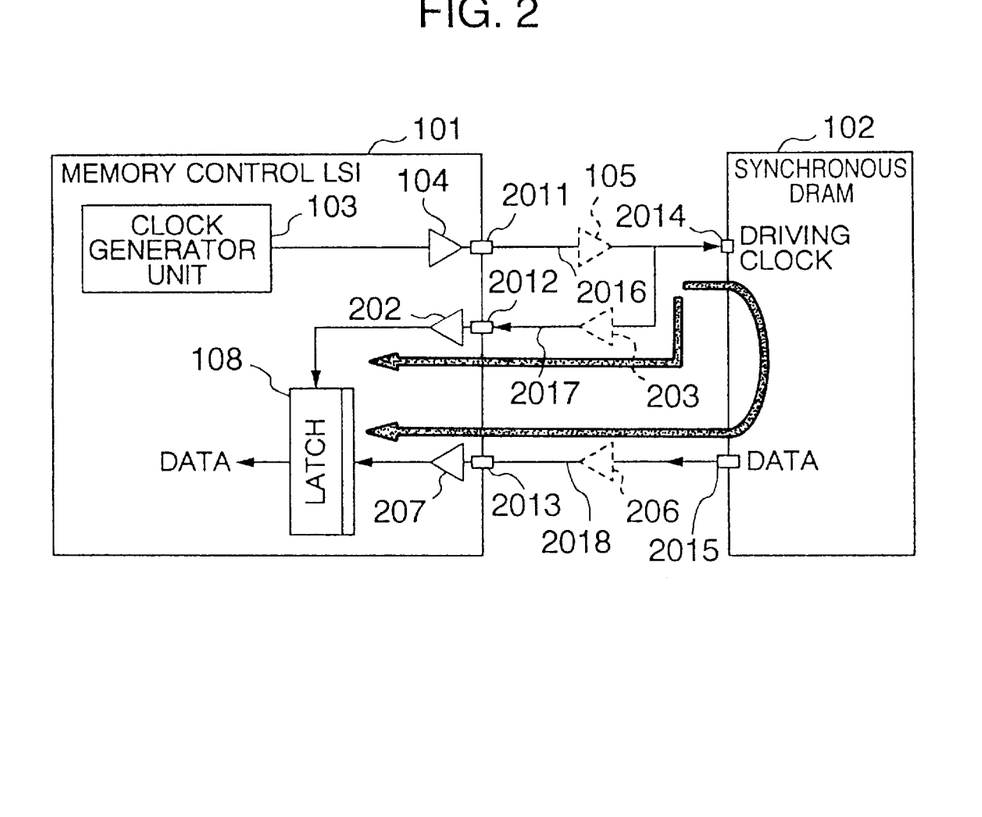
FIG. 2 is a block diagram showing a configuration of the connection between a main memory 1013 and a memory bus control unit 1012.

FIG. 2 is a block diagram showing a configuration of the connection between the main memory 1013 and the memory bus control unit 1012. In the figure, reference numeral 102 designates a synchronous DRAM device as the storage device constituting the main memory 1013. Reference numeral 101 designates a memory control LSI as the circuit for controlling the operation of inputting/outputting the data to/from the synchronous DRAM device 102. The memory control LSI 101 is provided in the memory control unit 1012. While the memory control LSI 101 is comprised of one LSI in the present embodiment, it is to be understood that one LSI is not necessarily required and hence the memory control LSI 101 may be combined with an input-output controller for controlling the operation of inputting/outputting the data to/from the CPU 1101, and the like into one LSI.

The memory control LSI 101 includes, but is not limited to, a clock generator unit 103, an output buffer 104, input buffers 202 and 107, and a data latch 108. Each of the output buffer 104 and the two input buffers 202 and 107 has the function of delaying a signal by a predetermined period of time to output the signal. Reference numeral 2011 designates a pin through which the clock signal which has been produced by the clock generator unit 103 is outputted, and reference numeral 2012 designates a pin through which the clock signal is fetched in from the outside. In addition, reference numeral 2013 designates a pin through which the data which has been outputted from the synchronous DRAM device 102 is received. In addition, while not shown in FIG. 2, the memory control LSI 101 includes, in addition thereto, at least a circuit for producing control signals such as a row address strobe signal (RAS), a column address strobe signal (CAS) and a write enable signal (WE), a circuit for delivering the data which has been received from the CPU 1011 to the synchronous DRAM device 102, and pins through which those signals are respectively inputted/outputted. On the other hand, the synchronous DRAM device 102 is the DRAM device which operates synchronously with the leading edge of the clock signal supplied from the outside and hence includes a pin 2014 through which the clock signal is inputted, and a pin 2015 through which the data is outputted to the outside. Hereinbelow, in particular, the clock signal which is supplied to the pin 2014 of the synchronous DRAM device 102 is referred to as the driving clock signal. In addition thereto, while in particular not shown in the figure, the synchronous DRAM device 102 includes pins through which the control signals such as the row address strobe signal (RAS), the column address strobe signal (CAS), the write enable signal (WE) and the address signal are respectively inputted/outputted. The pin 2014 of the synchronous DRAM device 102 is connected to the pin 2011 of the memory control LSI 101 through the wiring 2016 and hence the clock signal which has been produced by the clock generator unit 103 is inputted as the driving clock signal through the pin 2014. In addition, the data which has been outputted through the pin 2015 is transmitted through the wiring 2018 and then is inputted to the memory control LSI 101 through the pin 2013. In the present embodiment, the driving clock signal which has been supplied from the memory control LSI 101 to the synchronous DRAM device 102 is pulled back to the memory control LSI 101 to be used as the latch clock signal. For this reason, the wiring 2017 branches from the middle of the wiring 2016 which is distributed between the pin 2011 of the memory control LSI 101 and the clock pin 112 of the synchronous DRAM device 102. The wiring 2017 branching from the middle of the wiring 2016 is connected to the pin 2012 of the memory control LSI 101. By the distribution of this wiring 2017, the clock signal which has been outputted through the pin 2011 is pulled back to the inside of the memory control LSI 101 again. Incidentally, in FIG. 2, reference numerals 105, 203 and 206 designates wiring delays on the wirings 2016, 2017 and 2018, respectively.

Figure 3:
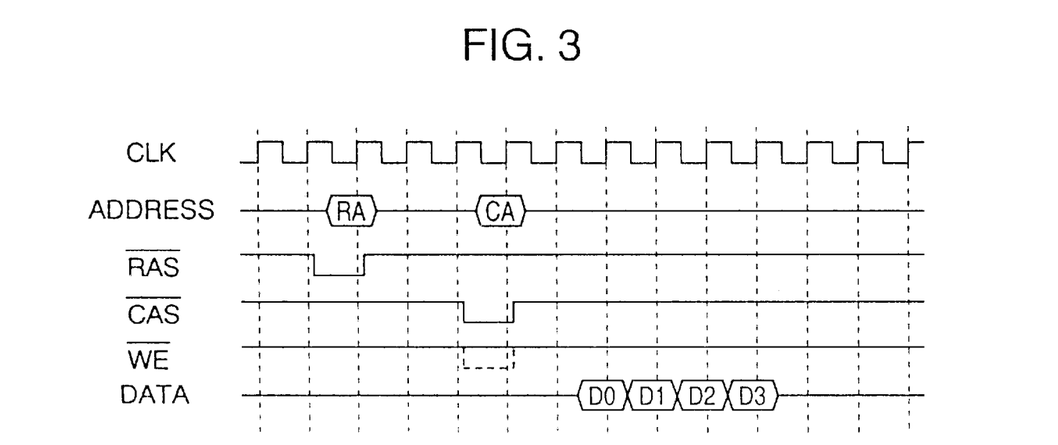
FIG. 3 is a timing chart showing the timing at the time when a synchronous DRAM device 102 reads out the data.

FIG. 3 is a timing chart showing the timing at the time when the synchronous DRAM device 102 reads out the data. The synchronous DRAM device 102 judges the values of the row address strobe signal (RAS), the column address strobe signal (CAS) and the write enable signal (WE) at the leading edge of the driving clock signal (CLK). The assignment of the data address to the synchronous DRAM device 102 is carried out on the basis of the address signal which is divided into the row address and the column address. The synchronous DRAM device 102 fetches therein the address, which is supplied at the time when the RAS signal is at the low level, as the row address and the address, which is supplied at the time when the CAS signal is at the low level, as the column address. In addition, as shown in FIG. 3, the synchronous DRAM device 102 can output continuously the data synchronously with the driving clock signal (CLK). For example, in the synchronous DRAM device which can cope with the driving clock signal having the frequency of 100 MHz, the access time ranging from the leading edge of the driving clock signal up to the time point when the new data is outputted is 9 ns, and hence the new data can be read out every 10 ns.

The description will hereinbelow be given with respect to the operation in the case where the CPU 1011 reads out the data from the main memory 1013.

The CPU 1011 instructs the memory bus control unit 1012 to read out the data from the main memory 1013. Then, the memory control LSI 101 provided in the memory bus control unit 1012 produces a reference clock signal in the clock generator unit 103 provided in the memory control LSI 101. Then, the reference clock signal is outputted from the pin 2011 to the outside through the output buffer 104, and is inputted as the driving clock signal (CLK) of the synchronous DRAM device 102 through the clock pin 2014. In addition, the memory control LSI 101 supplies both the RAS signal and the CAS signal to the synchronous DRAM device 102. Then, the synchronous DRAM device 102 judges the values of both the RAS signal and the CAS signal with the leading edge of the driving clock signal as the starting point and outputs the new data from the data output pin 2015. This data is inputted from the pin 2013 of the memory control LSI 101 through the wiring 2018 and then is supplied to the data latch 108 in the memory control LSI 101 through the input buffer 107. In addition, the driving clock signal which has been outputted from the pin 2011 is pulled back through the wiring 2017 branching from the middle of the wiring 2016 and then is inputted to the memory control LSI 101 through the pin 2012. The clock signal which has been pulled back to the memory control LSI 101 is supplied to the data latch 108 through the input buffer 202 (hereinafter, the clock signal which has been pulled back to the memory control LSI 101 is referred to as the latch clock signal for short when applicable). The data latch 108 latches the data, which has been inputted through the pin 2013, at the timing of the leading edge of the latch clock signal. The data which has been latched in the data latch 108 is then delivered to the CPU 1011 at another timing corresponding to the clock signal of the CPU 1011. Otherwise, that data is delivered to the peripheral circuits, such as the input-output control unit 1015, the auxiliary storage device control unit 1016 and the display control unit 1017, through the bus 1014 on the basis of the instruction issued from the CPU 1011. Then, the data which has been delivered to those peripheral circuits is transmitted from the communication equipment 1014 to the external equipment, stored in the compact disc 1021 or displayed on the display device 1022 for example.

Figure 4:
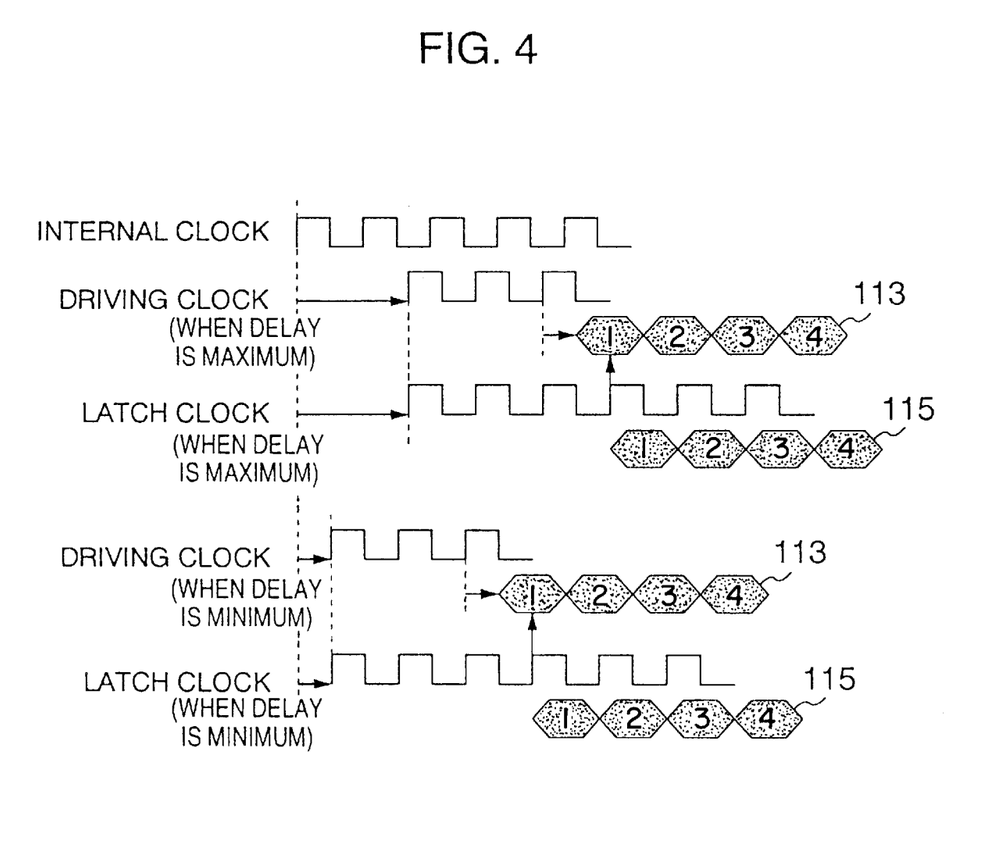
FIG. 4 is a timing chart showing the latch timing of the data which has been read out.

As described above, in the present embodiment, the driving clock signal which has been supplied to the synchronous DRAM device 102 is pulled back to the memory control LSI 101 and then is used as the clock signal which is used to latch the data outputted from the synchronous DRAM device 102. The difference between the delay of the data inputted to the data latch 108 with respect to the driving clock signal (i.e., the delay time of the data inputted to the data latch 108 with reference to the driving clock signal supplied to the pin 2014) and the delay of the latch clock signal of the latch clock signal with respect to the driving clock signal (i.e., the delay time of the latch clock supplied to the data latch 108, with reference to the driving clock signal supplied to the pin 2014) is the sum of the difference between the wiring delays 206 and 203 and the difference between the delay due to the input buffer 202 and the delay due to the input buffer 207. Since each of those delays is changed with the same tendency against the change in the operation environment such as the ambient temperature, the change in the difference between the delay of the data and the delay of the latch clock signal due to the operation environment becomes very small. Therefore, as shown in FIG. 4, the timing relationship between the data and the latch clock signal is kept approximately constant when the delay of the driving clock is maximum as well as when the delay of the driving clock is minimum (in the figure, reference numeral 113 designates the timing at which the data is outputted from the synchronous DRAM device 102 and reference numeral 115 designates the timing at which the data is outputted from the data latch 108). In order to latch the data at the same timing at all times, the clock period needs to be larger than the difference between the delay of the data and the delay of the latch clock signal. According to the structure of the present embodiment, that difference can be made smaller than the minimum period with which the synchronous DRAM device 102 can cope. As a result, the driving clock signal can be set to the maximum clock frequency with which the synchronous DRAM device can cope, and also it is possible to realize the page cycle of one address/one clock in which the function of the synchronous DRAM device is fully exhibited.

Figure 5:
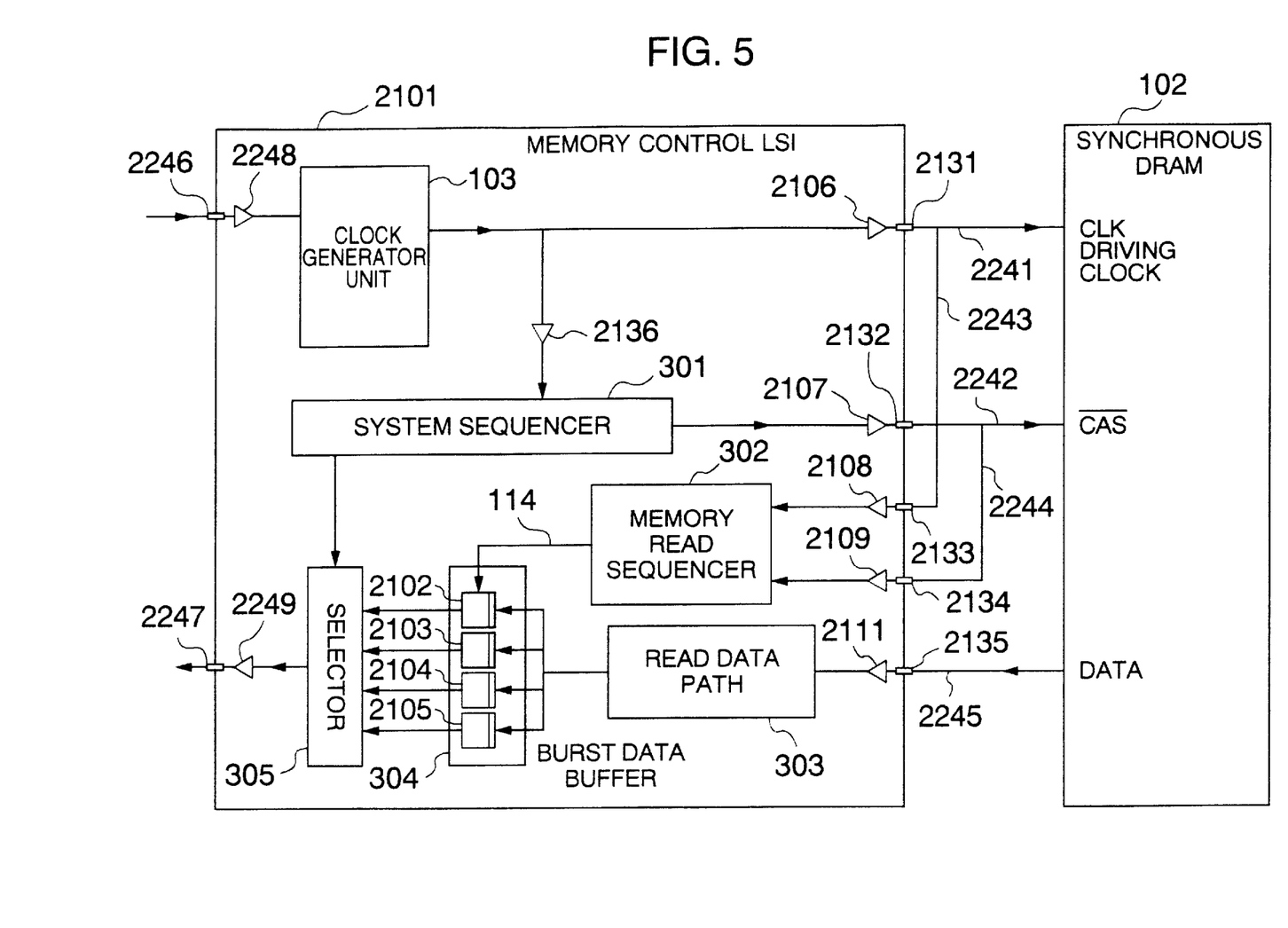
FIG. 5 is a block diagram showing a configuration of another constructional example of the connection between the main memory and the memory bus control unit.

FIG. 5 is a block diagram showing a configuration of the connection between the main memory 1013 and the memory bus control unit 1012 according to another embodiment of the present invention. In the present embodiment, the configuration of the memory control LSI is different from that of the memory control LSI shown in FIG. 2. A memory control LSI 210 includes, but is not limited to, the clock generator unit 103, a system sequencer 301, a memory read sequencer 302, a read data path 303, a burst data buffer 304 and a selector 305. Incidentally, in the present embodiment, the whole configuration of the information processing apparatus is not changed largely from that shown in FIG. 1.

The clock generator unit 103 receives the signal which has been inputted from the CPU through both a pin 2246 and an input buffer 2248 and then produces the reference clock signal. Then, the reference clock signal thus produced is outputted through an output buffer 2106 from a pin 2131 and then is inputted as the driving clock signal through the wiring 2241 to the synchronous DRAM device 102. In addition, the reference clock signal is also inputted through a clock buffer 2136 to the system sequencer 301. Then, the system sequencer 301 produces the CAS signal on the basis of the reference clock signal which has been inputted through the clock buffer 2136. Then, the CAS signal which has been produced by the system sequencer 301 is outputted through an output buffer 2107 from a pin 2132 and then is inputted through the wiring 2242 to the synchronous DRAM device 102. Then, the synchronous DRAM device 102 outputs the data synchronously with the driving clock.

The data which has been outputted from the synchronous DRAM device 102 is transmitted through the wiring 2245 and then is inputted through a pin 2135 to the memory control LSI 2101. Then, the data which has been inputted from the pin 2135 is passed through an input buffer 2111 and is subjected to the error inspection and the like in the read data path 303 and then is inputted to the burst data buffer 304.

The driving clock signal which has been outputted from the pin 2131 is pulled back to the memory control LSI 2101 through the wiring 2243 branching from the middle of the wiring 2241 and then is fetched in the memory control LSI 2101 through the pin 2133. Then, the driving clock signal which has been fetched in the memory control LSI 2101 through the pin 2133 is supplied to the memory read sequencer 302 through the input buffer 2108. Likewise, the CAS signal which has been outputted from the pin 2132 is also pulled back to the memory control LSI 2101 through the wiring 2244 branching from the middle of the wiring 2242 and then is supplied to the memory read sequencer 302 through both the pin 2134 and an input buffer 2109. Then, the memory read sequencer 302 judges the CAS signal, which has been pulled back, on the basis of the clock signal which has been pulled back and after detection of the CAS signal, outputs a signal to a signal line 114 every one clock after a lapse of two clocks. Buffers the number of which corresponds to the length of the continuous access of the synchronous DRAM device 102 (in this example, the four buffers 2102, 2103, 2104 and 2105) are provided in the burst data buffer 304. The data which has been continuously outputted from the synchronous DRAM device 102 is stored in turn in the respective buffers at the timing of the signal which has been supplied through the signal line 114 from the memory read sequencer 302. For example, in the case where the four data D0, D1, D2 and D3 is continuously outputted from the synchronous DRAM device 102, the data D0, D1, D2 and D3 is stored in the buffers 2102, 2103, 2104 and 2105, respectively.

The system sequencer 301 outputs the signal every one clock after a lapse of five clock signals of the produced CAS signal at the timing of the reference clock signal which has been supplied through the buffer 2136. The selector 305 is switched on the basis of that signal such that the data stored in the buffers 2102 to 2105 provided in the burst data buffer 304 is outputted in turn. The data which has been selected by the selector 305 is outputted through the output buffer 2249 from the pin 2247.

Figure 6A:
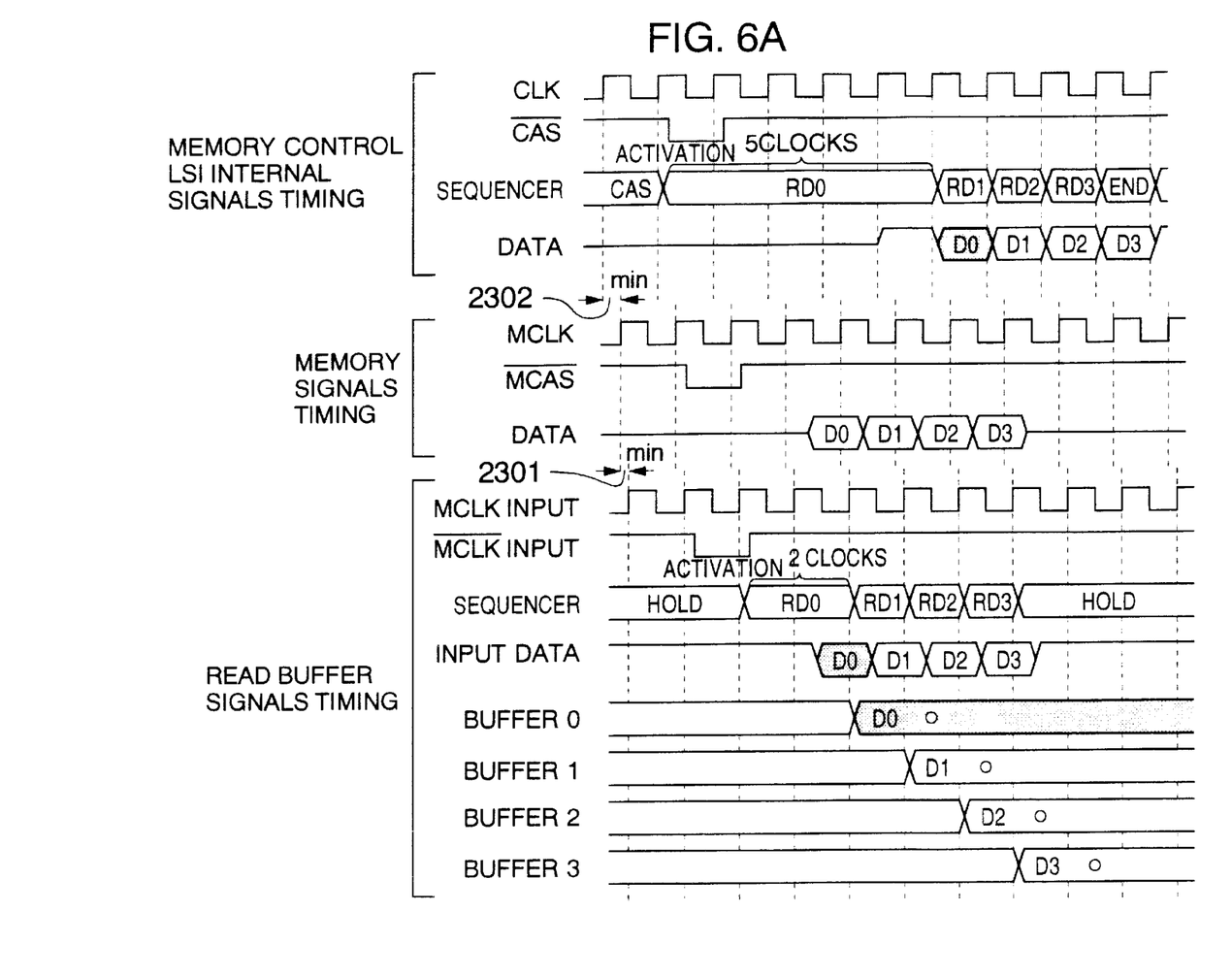
FIG. 6A is a timing chart showing the operation of reading out the data in the case where the delay of the driving clock supplied to the synchronous DRAM device is minimum.
Figure 6B:
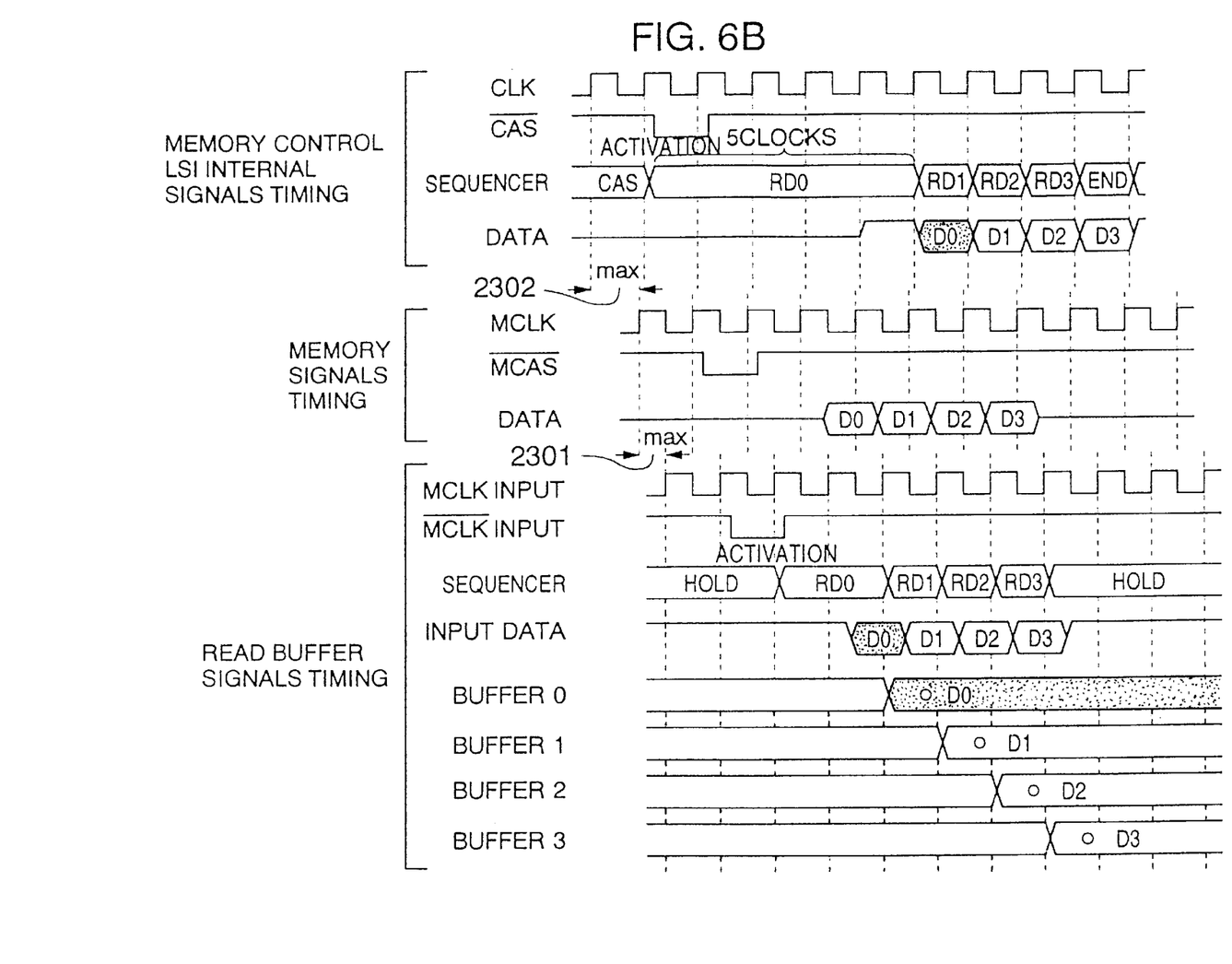
FIG. 6B is a timing chart showing the operation of reading out the data in the case where the delay of the driving clock supplied to the synchronous DRAM device is maximum.

FIGS. 6A and 6B are respectively timing charts each showing the timing of the signals in the present embodiment. FIG. 6A shows the basic timing in the inside of the memory control LSI, the timing of the signals on the memory side (the memory signals timing), and the timing of the signals with respect to the read out of the data on the memory control LSI side (the read buffer signals timing) in the case where the delay of the driving clock signal which is supplied to the synchronous DRAM device 102 is minimum. As for the basic timing, there are respectively shown the timing of the reference clock signal (CLK) which is produced in the clock generator unit 103, the timing of the CAS signal which is produced in the system sequencer 301, the timing of the switching signal which is supplied to the selector 305, and the timing of the data which is outputted through the selector 305. As for the memory signals timing, there are respectively shown in the order from the upper side the timing of the driving clock signal (MCLK) which is inputted to the synchronous DRAM device 102, the timing of the CAS signal (MCAS) which is inputted thereto, and the timing of the data which is outputted from the synchronous DRAM device 102. In addition, as for the read buffer signals timing, there are respectively shown in the order from the upper side the timing of the clock signal (MCLK IN) which is supplied to the memory sequencer 302, the timing of the CAS signal (MCAS IN) which is supplied to the memory sequencer 302, the timing of the switching signal which is outputted from the memory sequencer 302, the timing of the input data which is inputted to the read data path 303, and the data states in the buffers 2102, 2103, 2104 and 2105. In addition, FIG. 6B shows the basic timing in the inside of the memory control LSI, the memory signals timing, and the read buffer signals timing in the case where the delay of the driving clock signal which is supplied to the synchronous DRAM device 102 is maximum in the same manner as that in FIG. 6A. In addition, in FIGS. 6A and 6B, reference numeral 2302 designates a delay of the driving clock signal with respect to the reference clock signal, and also reference numeral 2301 designates a delay of the clock signal, which is supplied to the memory sequencer, with respect to the driving clock signal.

In the present embodiment, the two terminals, i.e., the pins 2133 and 2134 are provided in the memory control LSI such that both the clock signal and the CAS signal which are supplied to the synchronous DRAM device 102 are pulled back to the memory control LSI 2101 by utilizing those terminals. Then, on the basis of both the clock signal (MCLK IN) and the CAS signal (MCAS IN) which have been pulled back to the memory control LSI 2101, the fetching timing of the burst data buffer 304 is determined. Each of the delay 2301 of the signal (MCLK IN), which have been pulled back to the memory control LSI 2101, with respect to the driving clock signal (MCLK) and the delay of the data, which has been inputted to the read data path 303, with respect to the driving clock signal (MCLK) is the delay due to both the wirings distributed between the memory control LSI 2101 and the synchronous DRAM device 102, and the input buffers. Those two delays are changed with the same tendency against the change in the operation environment such as the ambient temperature. Therefore, even if the delay 2302 of the driving clock signal (MCLK) with respect to the reference clock signal (CLK) is largely changed due to the change in the operation environment such as the ambient temperature, the change in the difference between the above-mentioned two delays is very small. That is, this means that even if the period of the driving clock signal is reduced, the data can be stored in the respective buffers at the approximately same timing at all times against the change in the operation environment. As a result, the frequency of the driving clock signal can be made the maximum frequency with which the synchronous DRAMA device can cope, and hence the high speed reading operation can be made possible.

Figure 7:
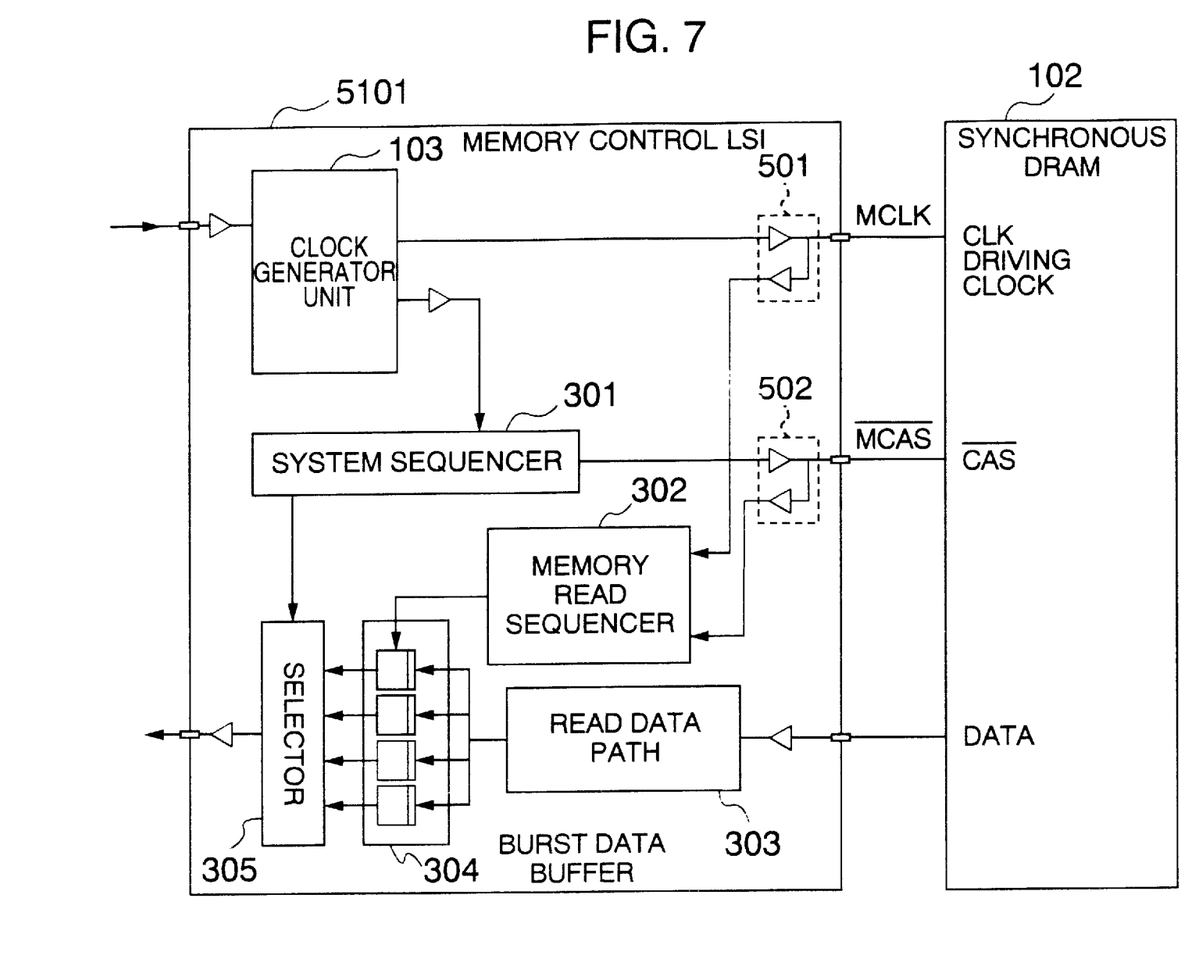
FIG. 7 is a block diagram showing a configuration of still another constructional example of the connection between the main memory and the memory bus control unit.

FIG. 7 is a block diagram showing a configuration of the connection between the main memory 1013 and the memory bus control unit 1012 according to still another embodiment of the present invention.

In the configuration shown in FIG. 7, a point of difference of the present embodiment from the above-mentioned embodiment shown in FIG. 5 is that both the driving clock signal and the CAS signal which are to be supplied to the memory read sequencer 302 of the memory control LSI 5101 are obtained by pulling back both the clock signal and the CAS signal to the memory read sequencer 302 just before outputted from the memory control LSI 101 not from the outside of the memory control LSI 101 but through respective bidirectional buffers 501 and 502. In the configuration shown in FIG. 7, the clock signal and the CAS signal which are supplied to the memory read sequencer 302 contains the delays due to the input-output buffers 501 and 502 with respect to the clock signal and the CAS signal which are outputted from the memory control LSI 5101, respectively. Therefore, the difference between the delays of the clock signal and the CAS signal, and the delay of the data is small, and hence in the same manner as that in the embodiment shown in FIG. 5, the frequency of the driving clock signal can be increased. However, in the resent embodiment, both the clock signal and the CAS signal which are supplied to the memory read sequencer 302 do not contain the delays due to the wirings distributed between the memory control LSI 5101 and the synchronous DRAM device 102. Therefore, the maximum frequency of the driving clock signal needs to be set to a lower value than that in the embodiment shown in FIG. 5. On the other hand, in the present embodiment, the input-output pins which are required for those signals to be pulled back from the outside of the memory control LSI 5101 (the pins 2133 and 2134 of the memory control LSI 101 shown in FIG. 5) are unnecessary, and hence the advantage is provided in which the number of pins of the memory control LSI can be reduced.

Figure 8A:
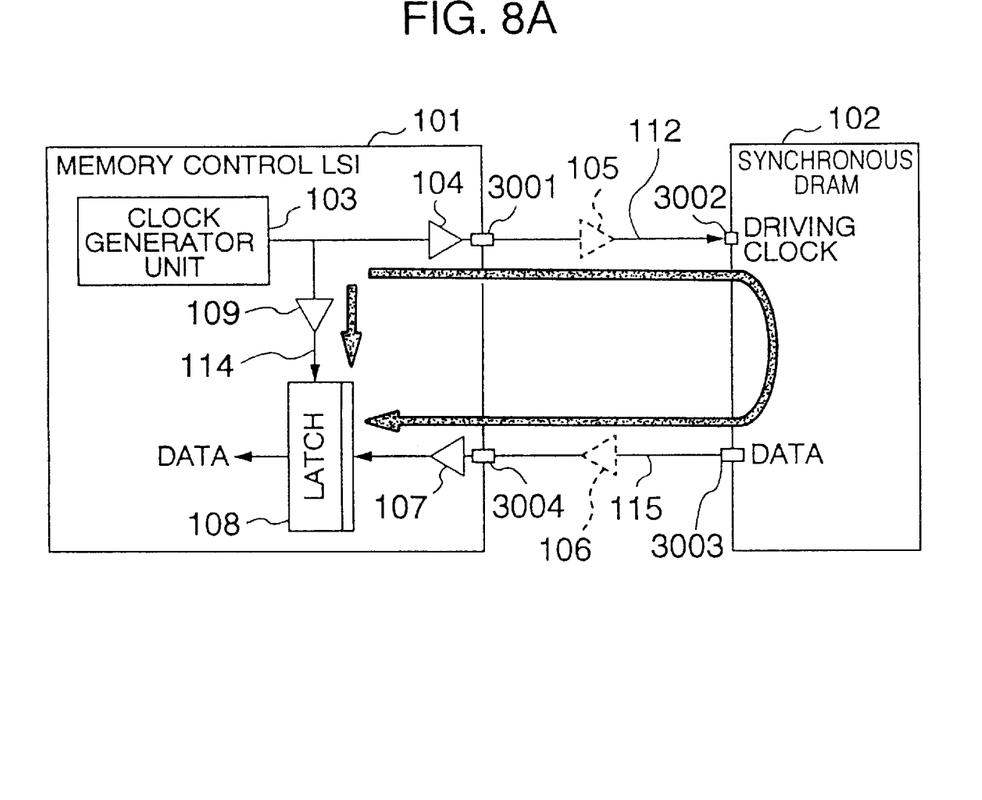
FIG. 8A is a block diagram showing a configuration of the connection between the main memory and the memory bus control unit to which the general memory control method is applied.

Next, the memory system to which the general memory control method is applied will hereinbelow be described by being compared with the above-mentioned embodiment. FIG. 8A is a block diagram showing a configuration of the memory system to which the general memory control method is applied. The memory system shown in FIG. 8 corresponds to the above-mentioned embodiment shown in FIG. 2.

In the memory system shown in FIG. 8A, the reference clock signal which has been produced in the clock generator unit 103 provided in the memory control LSI 101 is outputted through the output buffer 104 from a pin 3001 to the outside. Then, the reference clock signal which has been outputted from the pin 3001 is supplied as the driving clock signal for the synchronous DRAM device 102 to a pin 2002. Then, the synchronous DRAM device 102 outputs the new data to a pin 3003 with the leading edge of the driving clock signal as the starting point. Then, the data which has been outputted from the synchronous DRAM device 102 is inputted to a pin 3004 of the memory control LSI 101. The data which has been fetched in the memory control LSI 101 through the pin 3004 is supplied through the input buffer 107 to the data latch 108. With the reference clock signal, which was produced in the clock generator unit 103 and has been passed through the clock buffer 109, as the latch clock signal, the data latch 108 latches the input data at the timing of the leading edge of the latch clock signal. Now, both the delay due to the output buffer 104 and the delay due to the wiring load 105 on the substrate with respect to the reference clock signal which has been produced in the clock generator unit 103 are added to the driving clock signal which is supplied to the synchronous DRAM device 102. In addition, both the delay due to the wiring load 106 on the substrate and the delay due to the input buffer 107 with respect to the data which has been outputted from the synchronous DRAM device 102 are added to the data which is supplied to the data latch 108. On the other hand, the delay due to the clock buffer 109 with respect to the reference clock signal is added to the latch clock signal.

Figure 8B:
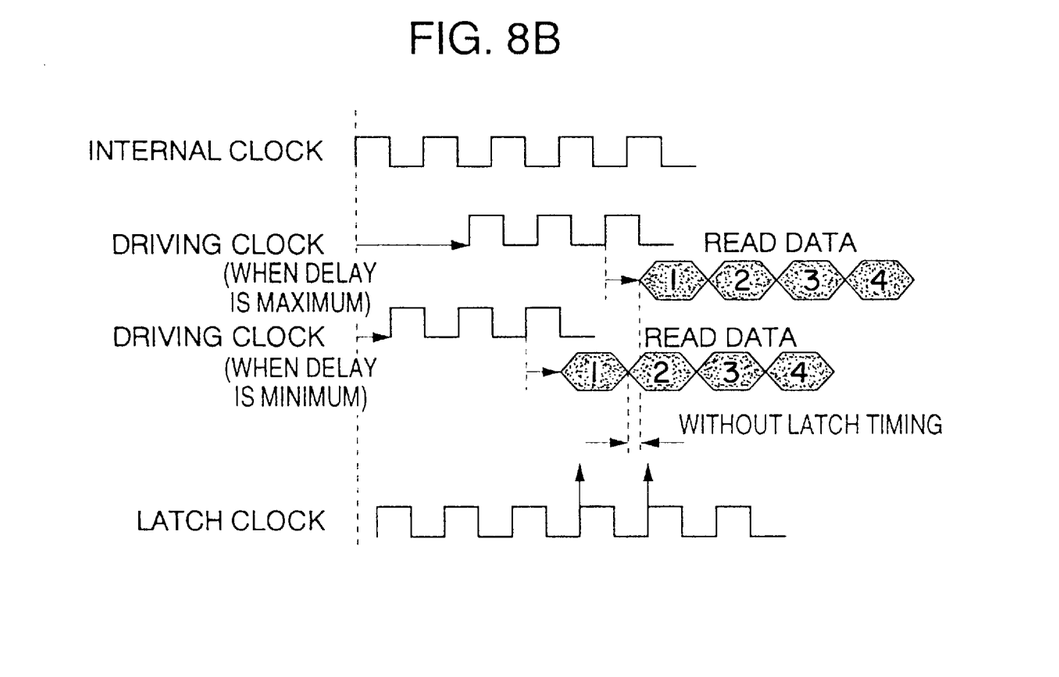
FIG. 8B is a timing chart showing the latch timing of the data which has been read out.

The value which is obtained by adding the access time of the synchronous DRAM device 102 (i.e., 9 ns for the device having the driving clock frequency of 100 MHz) to the delay of the driving clock signal with the reference clock signal as the starting point (i.e., the delay time due to both the output buffer 104 and the wiring load 105) and the delay of the data (i.e., the delay time due to both the wiring load 106 and the input buffer 107) is empirically about 30 ns (the typical value). In the memory system shown in FIG. 8A, the value of the delay of the latch clock signal with the reference clock signal as the starting point needs to be previously adjusted in correspondence to the value of the delay such that the data can be latched when the delay is maximum as well as when the delay is minimum. In this connection, the adjustment of the value of the delay of the latch clock signal is carried out by adjusting the value of the delay due to the clock buffer 109. However, the synchronous DRAM device 102 outputs one data only for one clock period of time of the driving clock signal. Therefore, as shown in FIG. 8B, if the difference between the maximum value of the delay of the data and the minimum value thereof with reference clock signal as the starting point exceeds one clock period of time of the driving clock signal supplied to the synchronous DRAM device 102, the system can not be designed so as to fetch therein the data every one clock. For example, even if the synchronous DRAM device 102 having the driving clock frequency of 100 MHz (the access time is 9 ns) is used in the main memory, in the case where the typical value of the delay is about 30 ns, since the difference between its maximum value and its minimum value is also empirically about 30 ns, the period of driving clock signal can not be made smaller than 30 ns. As described above, in the case where the memory system is constructed by utilizing the conventionally general memory control method, the difference between the maximum value of the delay of the driving clock signal and the minimum value thereof limits the operation frequency of the whole memory system and hence it is impossible to make the best use of the high speed operation of the synchronous DRAM device. On the other hand, in the above-mentioned embodiment, the frequency of the driving clock signal can be increased irrespective of the difference between the maximum value of the delay of the driving clock and the minimum value thereof since the difference in the delay between the clock signal for use in the latch and the data to be latched is always small.

While the present invention has been described with respect to the configuration of the connection between the synchronous memory device and the memory control LSI of the memory bus control unit for controlling the synchronous memory device, with the synchronous DRAM device used in the main memory of the information processing apparatus, as an example in the above-mentioned embodiment, it is to be understood that the present invention can be supplied to every memory device employing the synchronous DRAM device. For example, in the information processing apparatus shown in FIG. 1, in the case where the synchronous DRAM device is employed for the display memory 1023, the present invention can be applied as the memory control method in the display control unit 1017. In addition, even in the case where the auxiliary storage device control unit 1016 or the input-output control unit 1015 is provided with the buffer memory employing the synchronous DRAM device in order to absorb the difference in the data transfer speed between the bus 1014 and the communication equipment 1024, or between the bus 1014 and the auxiliary storage device such as the hard disc 1021, the compact disc 1020 or the like, the memory control method of the present invention can also be applied.

As set forth hereinabove with the preferred embodiments as the examples, according to the present invention, the relationship between the data and the latch clock signal can be kept approximately constant irrespective of the magnitude of the delay of the driving clock signal for the synchronous DRAM device. As a result, it is possible to realize the memory access with the page cycle of one address/one clock which makes the best use of the high speed operation of the synchronous DRAM device.

We claim:

1. An information processing apparatus comprising:
   a storage unit for outputting data every one clock period of time synchronously with a supplied clock signal;
   a control unit for carrying out at least the processing of supplying the clock signal to said storage unit and receiving the data;
   a first wiring through which the clock signal is delivered from said control unit to said storage unit;
   a second wiring through which the data is delivered from said storage unit to said control unit; and
   a third wiring, branching from said first wiring, through which the clock signal to be sent to said storage unit is delivered to said control unit,
   wherein said control unit includes a data holding unit for fetching therein the data which has been delivered through said second wiring and holding the data on the basis of the clock signal which has been delivered to said control unit through said third wiring.

2. An information processing apparatus according to claim 1, wherein: said control unit includes a clock generator unit for producing the clock signal, a fourth wiring through which the clock signal which has been produced in said clock generator unit is delivered to said first wiring, and a fifth wiring, branching from said fourth wiring, through which the clock signal which has been produced in said clock producing unit is inputted to said data holding unit for holding the data; and said data holding unit outputs the data, which has been fetched therein, at the timing of the clock signal of said fifth wiring.

3. An information processing apparatus according to claim 2, wherein said control unit is comprised of an integrated circuit, and said integrated circuit has said fourth wiring and also has a terminal through which said fourth wiring is connected to said first wiring, a terminal from which the clock signal which has been delivered to said control unit is fetched in said control unit, and a terminal from which the data is fetched in said control unit through said second wiring.

4. An information processing apparatus according to claim 3, further comprising:
 a system sequencer provided in said control unit for producing a control signal which is used to indicate the timing at which said storage unit fetches therein an address signal supplied to said storage unit;
 a sixth wiring through which the control signal which has been produced by said system sequencer is delivered from said control unit to said storage unit; and
 a seventh wiring, branching from said sixth wiring, through which the control signal is delivered to said control unit,
 wherein said data holding unit fetches therein the data starting after a lapse of a predetermined period of time with respect to the control signal, which has been delivered through said seventh wiring.

5. An information processing apparatus according to claim 4, wherein said control unit has a terminal through which the control signal is outputted, and a terminal through which an address signal, which has been delivered through said seventh wiring, is inputted.

6. An information processing apparatus comprising:
 a storage unit for outputting data every one clock period of time synchronously with an inputted clock signal; and
 a control unit for carrying out at least the processing of supplying the clock signal to said storage unit and receiving the data, said control unit having a clock signal producing unit for producing the clock signal, a data holding unit for fetching therein the data which has been outputted by said storage unit and holding the data, a delay unit for delaying the produced clock signal by a predetermined period of time to output the clock signal, a terminal through which the clock signal is outputted to said storage unit, a first internal wiring through which said data holding unit is connected to said terminal, and a second internal wiring, branching from said first internal wiring, through which the clock signal is transmitted through said first internal wiring to be inputted to said data holding unit, wherein said data holding unit fetches therein the data at the timing of the clock signal which has been inputted through said second internal wiring.

7. A memory control unit for carrying out at least the processing of supplying a clock signal to a storage unit and receiving data outputted from said storage unit, said memory control unit comprising:
 a clock generator unit for producing the clock signal;
 a clock terminal through which the clock signal is outputted;
 a data terminal through which the data is inputted;
 a data holding unit for fetching therein the data which has been inputted from said data terminal and holding the data;
 a terminal through which the clock signal which has been outputted from said clock terminal is delivered to be inputted to said data holding unit; and
 an internal wiring through which the clock signal which has been delivered is inputted to said data holding unit,
 wherein said data holding unit fetches in the data at the timing which is determined on the basis of the clock signal which has been inputted through said internal wiring.

8. A memory control unit for carrying out at least the processing of supplying a clock signal to a storage unit and receiving data outputted from said storage unit, said memory control unit comprising:
 a clock generator unit for producing the clock signal;
 a clock terminal through which the clock signal is outputted;
 a first buffer circuit provided between said clock generator unit and said clock terminal;
 a second buffer circuit for receiving an output outputted from said first buffer circuit and outputting a clock signal;
 a data terminal through which the data is inputted; and
 a data holding unit for fetching therein the data, which has been inputted through said data terminal, at the timing which is determined on the basis of the clock signal outputted from said second buffer circuit, and holding the data.

9. An information processing apparatus comprising:
 a processing unit;
 a storage unit for storing data which is to be accessed by said processing unit;
 a control unit for controlling the operation of reading/writing the data from/to said storage unit on the basis of an instruction issued from said processing unit;
 a first signal wiring through which a control signal, which has been outputted from said control unit and is used to determine the timing of the data output in said storage unit, is delivered from said control unit to said storage unit;
 a second signal wiring, branching from said first signal wiring, through which the control signal on said first signal wiring is delivered to said control unit; and
 a third signal wiring through which the data, which has been outputted from said storage unit, is delivered to said storage unit,
 wherein said control unit determines the timing, at which the data received from said third signal wiring is fetched therein, on the basis of the control signal which has been delivered through said second signal wiring.

10. An information processing apparatus according to claim 9, wherein the control signal includes a clock signal produced by said control unit.

11. An information processing apparatus according to claim 10, wherein the control signal further includes a control signal which is produced by said control unit and is used to determine the timing at which said storage unit fetches therein an address signal.

12. An information processing apparatus according to claim 10, wherein said storage unit includes a synchronous DRAM device, which receives the clock signal as an input and outputs the data synchronously with the clock signal.

* * * * *

UNITED STATES PATENT AND TRADEMARK OFFICE
CERTIFICATE OF CORRECTION

PATENT NO. : 5,828,871  
APPLICATION NO. : 08/601546  
DATED : October 27, 1998  
INVENTOR(S) : H. Kawaguci et al.

Page 1 of 1

It is certified that error appears in the above-identified patent and that said Letters Patent is hereby corrected as shown below:

Col. 11, claim 6, line 54 should read as follows:

-- 6. An information processing apparatus comprising:

a storage unit for outputting data every one clock period of time synchronously with an inputted clock signal; and a control unit for carrying out at least the processing of supplying the clock signal to said storage unit and receiving the data, said control unit having a clock signal producing unit for producing the clock signal, a data holding unit for fetching therein the data which has been outputted by said storage unit and holding the data, a delay unit for delaying the produced clock signal, a terminal through which the clock signal is outputted to said storage unit, a first internal wiring through which said ~~data holding~~ clock signal producing unit is connected to said terminal, and a second internal wiring, branching from said first internal wiring, through which the clock signal is transmitted through said first internal wiring to be inputted to said data holding unit, wherein said data holding unit fetches therein the data at the timing of the clock signal which has been inputted through said second internal wiring. --

Signed and Sealed this

Fourteenth Day of December, 2010

David J. Kappos  
*Director of the United States Patent and Trademark Office*